United States Patent Office 3,681,011
Patented Aug. 1, 1972

3,681,011
CRYO-COPRECIPITATION METHOD FOR PRODUCTION OF ULTRAFINE MIXED METALLIC-OXIDE PARTICLES
George E. Gazza, Sudbury, and Donald R. Messier, Marblehead, Mass., assignors to the United States of America as represented by the Secretary of the Army
No Drawing. Filed Jan. 19, 1971, Ser. No. 107,837
Int. Cl. C22b 59/00
U.S. Cl. 23—24 R                                6 Claims

ABSTRACT OF THE DISCLOSURE

A cryo-coprecipitation method for the production of stoichiometric ultrafine mixed metallic-oxide powders comprising the steps of: preparing an aqueous solution of mixed salts containing each cation in the desired stoichiometric proportion, freezing to form spheroids, contacting the spheroids with an aqueous hydroxide solution to precipitate mixed-cation hydroxides, drying and calcining the precipitate.

---

The invention described herein may be manufactured, used, and licensed by or for the Government for governmental purposes without the payment to us of any royalty thereon.

This invention relates to an improved method for the preparation of ultrafine mixed metallic-oxide powders utilized as starting materials in ceramic fabrication processes.

In certain ceramic fabrication processes such as, for example, pressure sintering, it is advantageous to utilize an ultrafine material so that the process can be carried out at lower temperatures. A high degree of material homogeneity greatly facilitates the preparation of single crystals by zone refining. Prior art processes for the production of ultrafine ceramic materials include, e.g., conventional coprecipitation of mixed salt solutions in an aqueous hydroxide solution at temperatures above freezing and the freeze-drying process.

The present cryo-coprecipitation method possesses certain advantages over the conventional coprecipitation and freeze drying methods. Compounds formed by conventional coprecipitation are more susceptible to phase separation than by the present described technique. In contrast to freeze-drying, the cryo-coprecipitation technique converts salts directly to hydroxides before firing thus avoiding possible rehydration of salts before converting to oxides. In distinction from the prior art coprecipitation method, the present method comprises the freezing of an aqueous solution of mixed salts containing each cation in the desired stoichiometric proportion, in, e.g., liquid nitrogen, to form spheroids. The spheroids are then immersed in an aqueous hydroxide solution at 0° C. to precipitate the mixed-cation hydroxides. The recovered precipitate is then dried and calcined. The present method enables us to form stoichiometric hydroxide compositions which may be used in fabrication processes such as pressure calcintering. In pressure calcintering the powder is converted directly from a low temperature amorphous material into the desired crystallographic form.

Furthermore, since fine spheroids of the frozen, aqueous mixed salt solution will float on liquid nitrogen, powder production is readily adaptable to a continuous process.

It is an object of this invention to provide and disclose an improved method for the production of stoichiometric ceramic oxide powder compositions.

It is a further object of this invention to provide and disclose an improved method for the production of stoichiometric ceramic oxide powder compositions of ultrafine particle size.

It is a further object of this invention to provide and tion may be had by referring to the following description tremely active ceramic oxide powder compositions with high surface area and ultrafine particle size.

It is a further object of this invention to provide and disclose an improved method for the production of stoichiometric ceramic oxide powder compositions whereby in segments thereof are adaptable to a batch or continuous process.

Other objects and a fuller understanding of the invention may be had by referring to the following description and claims.

The ceramic oxide powders were prepared utilizing hydrated salts selected from the group consisting of chlorides and nitrates, as described in Examples 1–3 below.

EXAMPLE 1

An aqueous solution of a mixed salt was prepared utilizing 33.94 grams of $AlCl_3.6H_2O$ (0.146 mole) and 14.29 grams of $MgCl_2 6H_2O$ (0.703 mole). Sufficient water was added to completely dissolve the salts. The resultant mixed aqueous salt solution was injected into liquid nitrogen to form frozen spheroids. The frozen spheroids were then immersed in a solution of ammonium hydroxide maintained at a temperature no higher than 5° C. to precipitate the mixed-cation hydroxides. The precipitate was recovered by decantation and dried at low temperatures, e.g., with infrared lamps. The dry powder was calcined by heating in air at a temperature of less than 1000° C. 10 grams of magnesium aluminate spinel ($MgAl_2O_4$) was obtained. If it is desired to maintain the powder in hydroxide form, it may be washed with distilled water and calcined at lower temperature, e.g., at about 200° C.

EXAMPLE 2

The process of Example 1 was repeated utilizing 52.74 grams of $Al(NO_3)_3.9H_2O$ (0.141 mole) and 18.02 grams of $Mg(NO_3)_2.6H_2O$. 10 grams of magnesium aluminate spinel was obtained.

EXAMPLE 3

The process of Example 1 was repeated utilizing 15.02 grams (0.049 mole) of $YCl_3.6H_2O$ and 20.34 grams (0.084 mole) of $AlCl_3.6H_2O$. 10 grams of yttrium-aluminum garnet was recovered.

In addition to the advantages previously enumerated, over the conventional coprecipitation method the present method eliminates the freeze-drying step as required by the freeze-dry process. Furthermore, the unique coagulated nature of the precipitate obtained greatly facilitates removal of the excess solution by decantation. Thus, the amount of filtration, which may be required, is minimized. A further unique feature of the present cryo-coprecipitation process using frozen mixed salt spheroids is that precipitation appears to occur initially at the surface of the spheroid and progress radially toward the center. This produces surface hydroxides of stoichiometric composition which act as nuclei for subsequent precipitation. Coprecipitation occurs quantitatively without segregation of the hydroxides of like cations. This intimate, homogeneous mixing of cations is the key to the ease of formation of compounds at calcination temperature far below those ordinarily required for solid state diffusion controlled reactions between individual oxide particles.

Although we have described our invention with a certain degree of particularity, we wish it to be understood that we do not desire to be limited to the exact materials and method of preparation shown and described, for obvious modifications will occur to a person skilled in the art.

Having described our invention we claim:

1. A method for the preparation of a stoichiometric ultra fine magnesium aluminate spinel or yttrium-aluminum garnet metallic-oxide powder composition comprising the steps of; preparing an aqueous solution of mixed hydrated water soluble salts selected from the group consisting of chlorides and nitrates and capable of being coprecipitated, which contains each cation in the desired stoichiometric proportions, injecting the resultant mixed aqueous salt solution into liquid nitrogen to freeze and form spheroids, immersing the frozen spheroids in an aqueous hydroxide solution maintained at a temperature no higher than 5° C. to precipitate the mixed-cation hydroxides, drying and calcining to form said powder composition.

2. A method in accordance with claim 1 wherein the mixed salts are a nitrate selected from the group consisting of;
   (a) $Al(NO_3)_3.9H_2O$ and $Mg(NO_3)_2.6H_2O$, and
   (b) $Al(NO_3)_3.9H_2O$ and $Y(NO_3)_3.6H_2O$.

3. A method in accordance with claim 1 wherein the mixed salts are a chloride selected from the group consisting of;
   (a) $AlCl_3.6H_2O$ and $MgCl_2.6H_2O$, and
   (b) $YCl_3.6H_2O$ and $AlCl_3.6H_2O$ 4. A method in accordance with claim 1 wherein the aqueous hydroxide solution is ammonium hydroxide.

5. A method in accordance with claim 1, wherein the dried precipitate is calcined at a temperature less than 1000° C.

6. A method in accordance with claim 1 wherein the dried precipitate is calcined at a temperature of about 200° C.

References Cited
UNITED STATES PATENTS

| | | | |
|---|---|---|---|
| 3,516,935 | 6/1970 | Monforte et al. | 23—51 R X |
| 3,539,517 | 11/1970 | Mitchell et al. | 23—51 R |
| 3,544,266 | 12/1970 | Palmer et al. | 23—52 |
| 3,509,057 | 4/1970 | Greger | 23—52 X |

HERBERT T. CARTER, Primary Examiner

U.S. Cl. X.R.

23—51 R, 52

PO-1050
(5/69)

UNITED STATES PATENT OFFICE
CERTIFICATE OF CORRECTION

Patent No. 3,681,011            Dated    1 August 1972

Inventor(s)    GEORGE E. GAZZA AND DONALD R. MESSIER

It is certified that error appears in the above-identified patent and that said Letters Patent are hereby corrected as shown below:

Page 1, column 2, revise lines 3 - 6 to read:

"It is a further object of this invention to provide and disclose an improved method for the production of extremely active ceramic oxide powder compositions with high surface area and ultrafine particle size."

Signed and sealed this 19th day of December 1972.

(SEAL)
Attest:

EDWARD M. FLETCHER, JR.           ROBERT GOTTSCHALK
Attesting Officer                  Commissioner of Patents